J. RAY.
METAL BASKET.
APPLICATION FILED MAY 8, 1911.
1,046,016.
Patented Dec. 3, 1912.
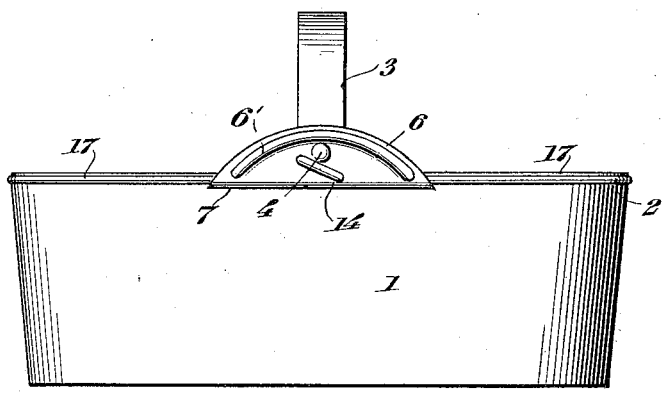
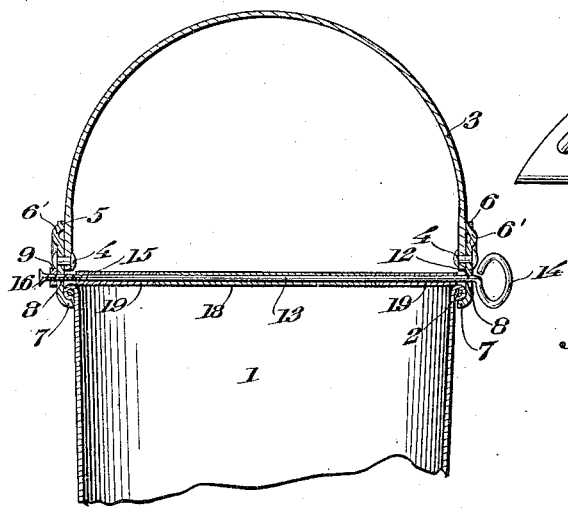
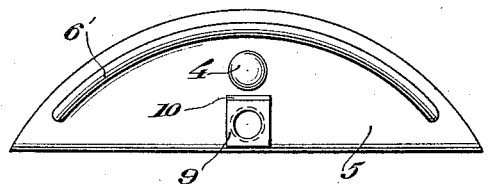
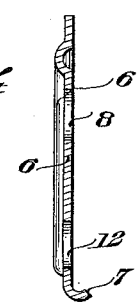
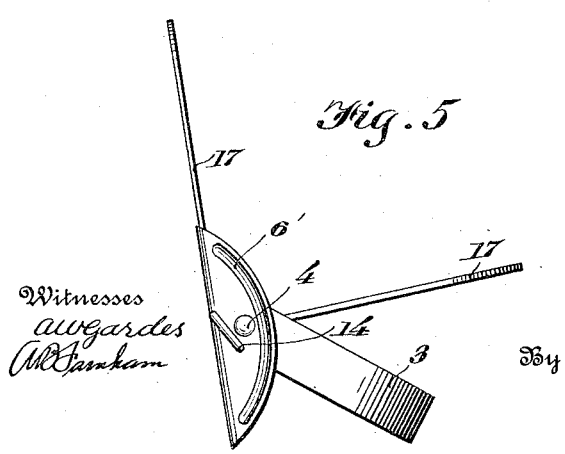
Inventor
Joseph Ray
Witnesses
By Geo. W. Subs.
Attorney

UNITED STATES PATENT OFFICE.

JOSEPH RAY, OF OREANA, ILLINOIS.

METAL BASKET.

1,046,016.  Specification of Letters Patent.  Patented Dec. 3, 1912.

Application filed May 8, 1911. Serial No. 625,731.

*To all whom it may concern:*

Be it known that I, JOSEPH RAY, a citizen of the United States, and a resident of Oreana, in the county of Macon and State of Illinois, have invented certain new and useful Improvements in Metal Baskets, of which the following is a specification, reference being had to the accompanying drawing.
This invention has relation to certain new and useful improvements in metal baskets; and the object of my invention is to provide a device of this general character of a simple and inexpensive nature and of a durable and neat construction which shall be capable of being readily cleaned and sterilized to render the same free from objectionable odors and bacteria, the basket being further arranged to removably hold a lid carrying handle so that the basket may be used as a vessel and the lid as a food holder.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1, shows a side elevational view of a metal basket embodying my invention. Fig. 2, is an enlarged transverse sectional view with portions broken away. Fig. 3, shows an enlarged detached detail of one of the ear pieces. Fig. 4, shows a transverse sectional view through one of the ear pieces, and Fig. 5, shows the lids arranged as a food holder.

This invention has relation to certain new and useful improvements in metal baskets, especially adapted to meet the needs of farmers and grocerymen who require a strong, serviceable basket which will stand rough usage and be capable of being easily cleaned.

In my present invention I aim to provide a metal basket intended to replace the ordinary wooden splint basket used by farmers, grocerymen, deliverymen and others who require a strong, serviceable basket.

In carrying out the aim of my invention I provide a metal basket the handle and lids of which are removably secured to the basket, so that fish, eggs, garden truck, groceries and the like can be readily packed into the same and removed therefrom after the lids and handle have been disconnected, the basket being of metal can further be used as a water carrying vessel, in case of necessity.

In the accompanying drawings the numeral 1, designates the basket proper which is of any suitable shape, size and capacity, and the upper edge of which is reinforced by means of a wire bail, the metal along the upper edge being flanged over the bail, as is usual in constructing sheet metal vessels. In connection with such a sheet metal vessel, I employ a handle 3, at each end carrying a rivet 4, these rivets giving pivotal support to the two similar ear pieces 5 and 6, shown in Figs. 4 and 3. Each ear piece is in the form of a flat semicircular member, the straight edge of which is recurved to provide a clasping flange 7, as clearly shown in Fig. 4. Each ear piece is further provided with an outstanding strengthening bead 6', and a rivet opening 8. One of the ear pieces is provided with a nut 9, suitably secured thereto. To further hold the nut against accidental rotation, I provide the flange 10, stamped out of the ear piece, as shown in Fig. 3. The opposite ear piece is provided with an unthreaded opening 12, as shown in Fig. 4.

Held within the unthreaded opening 12, and screwed into the threaded opening of the opposite ear piece, is a pin 13, having the operating loop 14, and the end of which is threaded, as shown in 15. This pin is loosely held within the unthreaded opening 12, and screws into the nut 9, of the opposite ear piece, the end of the pin being flanged as shown at 16, in Fig. 2, so that the pin will not become detached from the ear pieces. Held pivotally to this pin 13, are two similar lid sections 17, the ends 18 and 19, of which are flanged about the pin 13, to hingedly connect the lid member 17, to said pin 13.

In order to secure the handle 3, and the lids 17, to the sheet metal basket, the operator unscrews the pin 13, so that the flanges 7, of the ear pieces can be carried below the upper bail reinforced edge of the basket. As soon as the ear pieces have been properly positioned, the operator tightens the screw pin 13, firmly clasping the ears to the basket. In Fig. 1, the handle and lids are shown as secured to the basket. It is of course understood that these metal baskets can be made in various sizes. A small size of the basket is admirably adapted to be used for lunch carrying purposes, as the basket is strong and can be kept sweet and clean in being easily cleansed.

Now, should it be desired at any time to use the basket as a pan, the operator would simply unthread the pin 13, so that the ear pieces can be sprung free of the basket. The lids 17, can then be made to serve as a tray in turning one lid at right angles to the other and clamping them together by means of the pin 13, as shown in Fig. 5.

A metal basket constructed according to my invention can be kept clean and sanitary, and is further simple and inexpensive in construction, and both durable and efficient in operation and the adjustment of the lid upon the basket or its removal therefrom, may be accomplished with ease, accuracy and despatch. My basket is further nicely adapted to be used for shipping purposes and where especially used in carrying fruit, the body of the basket may be perforated insuring free ventilation.

Having thus described my said invention, what I claim as new and desire to secure by United States Letters Patent is:—

1. A sheet metal basket the upper edge of which is reinforced by means of a wire bail, in combination with a handle, two similar ear pieces each having a recurved clamping flange for coaction with said bail reinforced edge, an ear piece pivotally connected to each end of said handle, one of said ear pieces having a threaded and the other an unthreaded opening, and a threaded pin loosely held within said unthreaded opening and screwing into said threaded opening, so that said ear pieces may be clamped to said basket.

2. A sheet metal basket the upper edge of which is reinforced by means of a wire bail, in combination with a handle, two similar ear pieces, each having a recurved clamping flange for coaction with said bail reinforced edge, one ear piece being pivotally connected to each end of said handle, one of said ear pieces having a threaded and the other an unthreaded opening, a pin having its end threaded loosely held within said unthreaded opening and screwing into said threaded opening so that said ear pieces may be clamped to said basket, and two similar lid sections pivotally secured to said pin.

In testimony whereof I affix my signature, in presence of two witnesses.

JOSEPH RAY.

Witnesses:
E. G. COVAULT,
B. F. SHIPLEY.

---

Copies of this patent may be obtained for five cents each, by addressing the "Commissioner of Patents, Washington, D. C."